Sept. 29, 1931.  G. R. WELLS  1,824,853
CHARGING DEVICE
Filed July 2, 1929   3 Sheets-Sheet 1

INVENTOR.
Glen R. Wells
BY Jesse R. Langley
ATTORNEY

Sept. 29, 1931. G. R. WELLS 1,824,853
CHARGING DEVICE
Filed July 2, 1929 3 Sheets-Sheet 2

INVENTOR.
Glen R. Wells.
BY Jesse R. Langley
ATTORNEY.

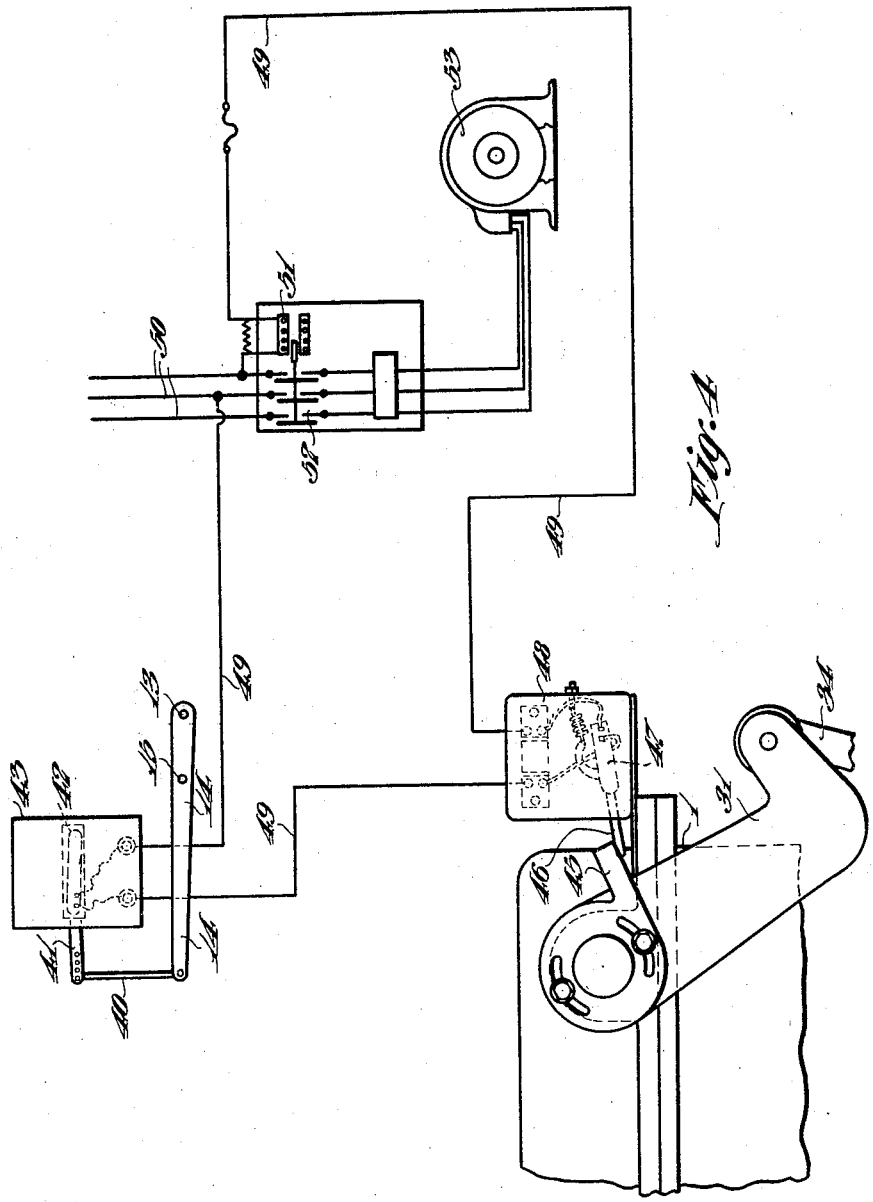

Patented Sept. 29, 1931

1,824,853

UNITED STATES PATENT OFFICE

GLEN R. WELLS, OF FORT WAYNE, INDIANA, ASSIGNOR TO THE WESTERN GAS CONSTRUCTION COMPANY, A CORPORATION OF INDIANA

CHARGING DEVICE

Application filed July 2, 1929. Serial No. 375,533.

This invention relates to charging machines for gas generators in which the weigh hopper is located within the body of the charging device.

The conventional charging device comprises a double bell arrangement at the top of the generator with sufficient space between the two bells to form a magazine for holding enough fuel for one charge. Since the bells are not moved away from their seats simultaneously the fuel is admitted without allowing any gas to escape from the generator.

Heretofore weighing devices for the charges of fuel, if used, have been located above and outside the charging device.

In accordance with the present invention, the weigh hopper is located in the magazine space between the two bells and this arrangement results in a great reduction of head-room, which reduction is one of the objects of the invention.

In the drawings,

Fig. 4 is a wiring diagram showing the electrical connections for the control switches.

Figure 1:
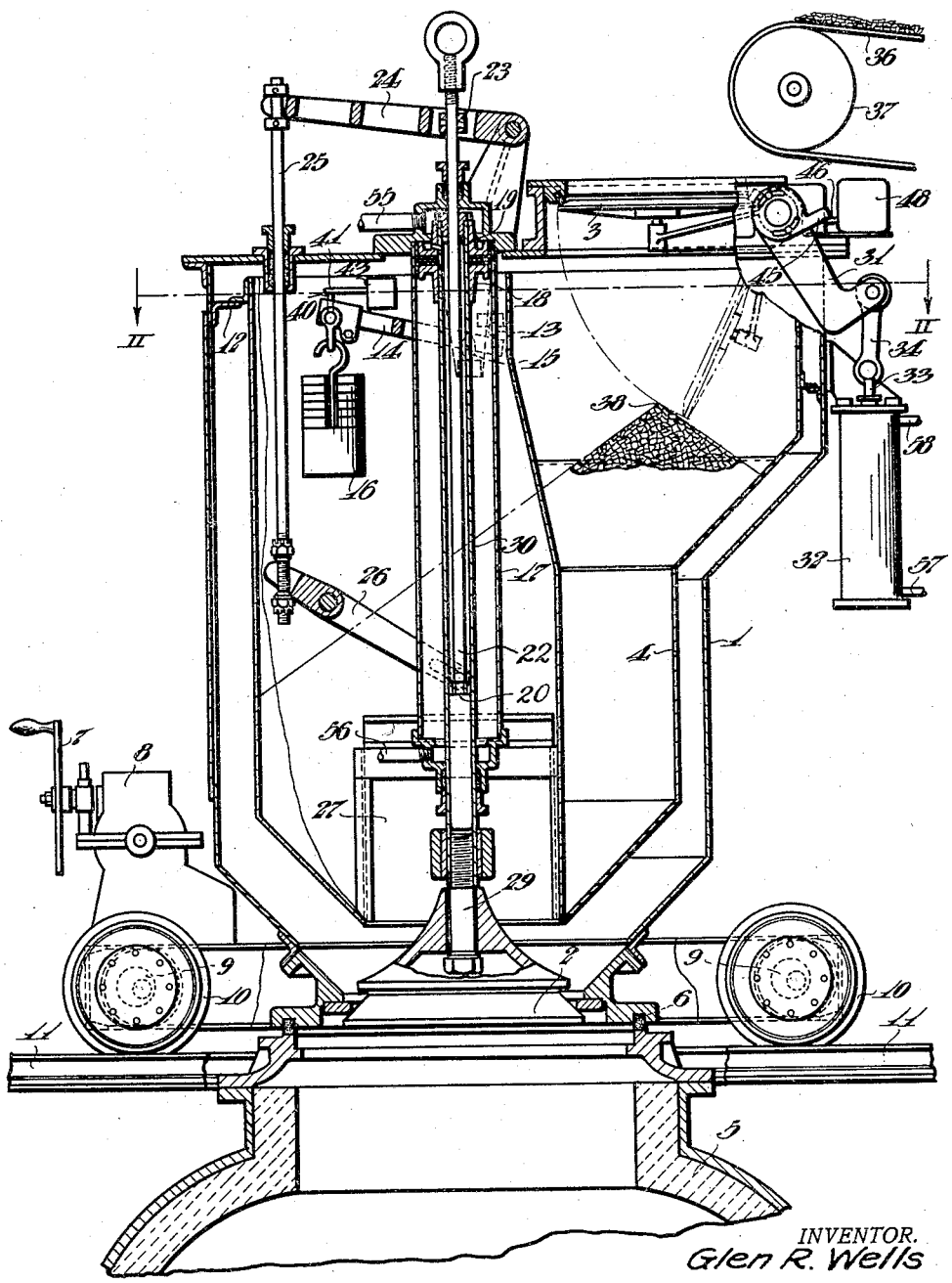
Figure 1 is a vertical cross section of the charging machine taken on line I—I of Fig. 2.
Figure 2:
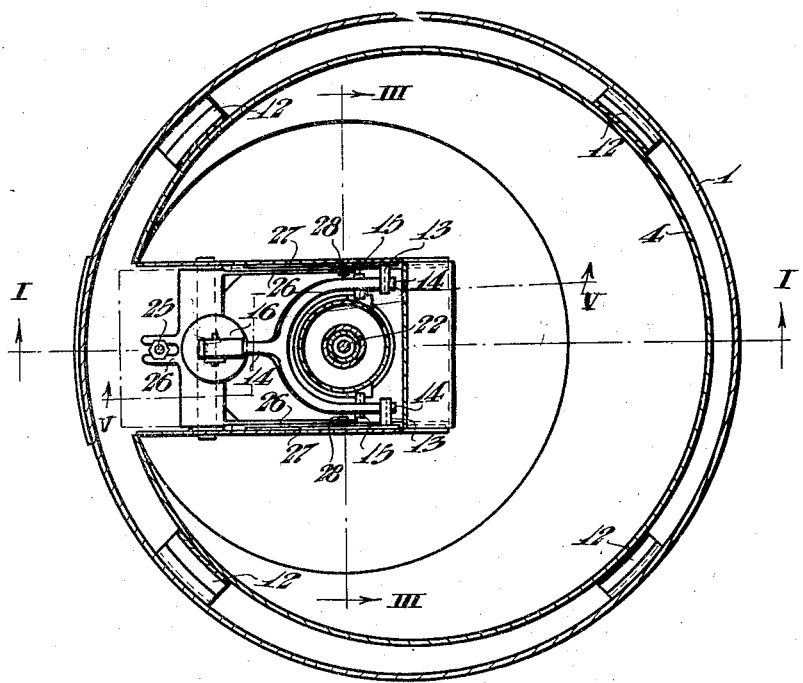
Fig. 2 is a horizontal cross section taken on line II—II of Fig. 1.
Figure 3:
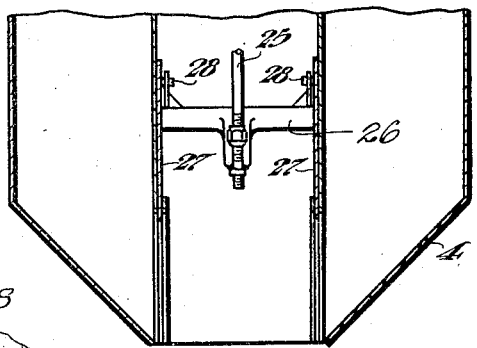
Fig. 3 is a vertical cross section of a part of the apparatus taken on line III—III of Fig. 2.

The charging machine comprises a hollow body or enclosure 1 provided with a lower charging bell 2 and a door 3, which is the equivalent of the usual upper charging bell. The weigh hopper 4 is located within the body 1 and approximately conforms to the contour of the body.

The charging machine rests on the gas generator 5 and is in gas-tight communication therewith by means of a packing ring 6. A hand wheel 7, by means of appropriate reduction gearing 8, rotates eccentrics 9 within flanged wheels 10 to depress the wheels to engage the rails 11 for elevating the entire charging machine, separating packing ring 6 from the top of generator 5 and permitting the charging machine to be rolled away from the top of the generator.

When the hopper 4 is in its lowermost position, it is supported by a plurality of pairs of angular brackets 12 from the interior of the body 1. At all other positions the weigh hopper 4 is supported by knife edges 13 resting on a lever 14 which is fulcrumed on stationary knife edges 15. The hopper is counterbalanced by a weight 16 located at the end of lever 14.

The charging bell 2 is connected by means of a rod 29 and a tube 30 to a piston 18 mounted by reciprocal movement in a vertical hydraulic cylinder 17 located centrally with respect to the body 1 and within a reentrant portion of the hopper 4. The hydraulic cylinder 17 is provided with hydraulic pressure and relief conduits 55 and 56 at the upper and lower extremities thereof, respectively.

In the position illustrated in Fig. 1, the conduit 56 is assumed to be in communication with a source of fluid under pressure, and the conduit 55 is in communication with a zone of lower pressure, so that the bell 2 is held in its uppermost position.

Reversal of the pressure conditions in the conduits 55 and 56 causes the piston 18, the tube 30 and the bell 2 to descend, the latter entering the generator 5.

Just before the bell 2 reaches its lowermost position, a collar 19 attached to the piston 18 engages a nut 20 threaded on to the lower end of a slender rod 22 located coaxially with respect to the tube 30. Further downward movement of the collar 19 as the bell 2 completes its stroke causes a corresponding lowering of the rod 22.

The rod 22 is fastened at its upper end by means of a clamp 23 to a lever 24 which in turn acts through a vertical rod 25 to actuate a forked lever 26. The ends of the lever 26 opposite to the end engaged by the rod 25 are fastened by means of pins 28 to a pair of gates 27. Hence, in the last few inches of downward travel of the bell 2, the depression of the nut 20 causes the gates 27 to open, permitting fuel to flow from the hopper 4 into the generator 5.

A lever arm 31 is keyed to the shaft on which the upper door 3 is pivoted and is actuated by a piston within a hydraulic cylinder 32 by means of piston rod 33 and connecting link 34 to open the door 3 as the piston rises. When the door is open, movement of endless belt 36 over the pulley 37 can deposit fuel through the opening of door 3 into the hopper 4 and to a height indicated at 38 without interfering with the closing of the door 3.

When the hopper 4 is fully charged with fuel, the end of the lever 14 bearing the weight 16 rises and by means of a vertical link 40 tilts lever 41 and a mercury container 42 mounted thereon to open the circuit through a switch 43.

When the door 3 is closed by means of the cylinder 32 a small arm 45 attached to the shaft on which arm 31 and door 3 are mounted tilts a lever 46 and also a mercury container 47 mounted thereon to break the electric circuit through switch 48.

When the weigh hopper 4 is emptied of fuel thereby lowering weight 16 and closing switch 43, and when cylinder 32 opens the door 3 thereby closing the circuit through switch 48, circuit 49, shown in Fig. 4, is closed between two wires of the three wire system 50, thereby energizing solenoid 51. Movement of the armature within solenoid 51 closes switch 52 to supply current from the three wire system 50 to the motor 53, which is connected through suitable gearing to the endless belt conveyor 36, shown in Fig. 1, which recharges the weigh hopper.

Power to actuate the piston in cylinder 17 is supplied through pipes 55 and 56 leading from the top and bottom of the cylinder to an automatic hydraulic control device, not shown. Likewise, power is supplied to cylinder 32 by pipes 57 and 58 connected to the same automatic hydraulic control device.

Figure 5:
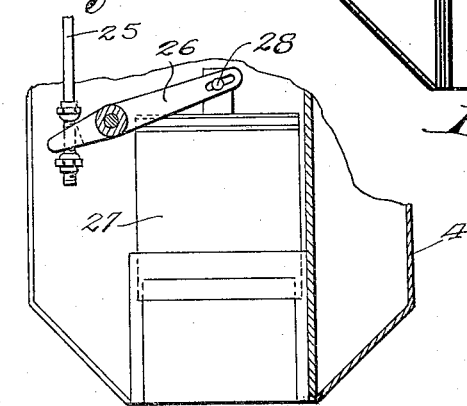
Fig. 5 is a vertical sectional view of a part of the apparatus, taken along the line V—V of Fig. 2.

The operation of the charging machine is as follows:

Starting with the door 3 in closed position and the weigh hopper 4 filled with fuel, the automatic control device at an appropriate time in the cycle of the gas generator exerts fluid pressure through the pipe 55 to cause the piston 18 to descend and thereby lower the bell 2 and then open the gates 27 as shown in Fig. 5. This causes the entire charge in the weigh hopper 4 to flow through gates 27, strike the inclined surface of the bell 2 in its lower position and scatter over the surface of the fuel bed in the body of the generator 5.

The automatic hydraulic control device then exerts fluid pressure through the pipe 56, restoring bell 2 and gates 27 to closed position, and in the meantime weight 16 has descended to close switch 43. This would tend to energize solenoid 51 and start motor 53 were it not that door 3 is closed and switch 48 is open.

After the bell 2 and gates 27 are closed, the automatic hydraulic control device exerts fluid pressure through pipe 57 to hydraulic cylinder 32, opening upper door 3 and thereby closing switch 48. Since switch 43 is already closed, solenoid 51 is energized and switch 52 is closed for starting the motor 53 to actuate endless belt 36.

Movement of the endless belt 36 continues until sufficient fuel has dropped through the opening of door 3 into the hopper 4 to overbalance weight 16, thereby raising the end of lever 14 and opening switch 43 which stops the motor 53, leaving the required or predetermined weight of fuel deposited in weigh hopper 4. Later, the automatic control device sends fluid through pipe 58 to close door 3 and when, during the next cycle of the gas generator being supplied, the automatic control sends fluid through the pipe 55 to start the descent of piston 18, the above outlined cycle of operation of the charging machine is repeated.

The placing of the weigh hopper within the body of the charging machine and between the upper and lower charging bells and the location of the hydraulic cylinder that actuates the lower bell within the body of the machine reduces the headroom required for the charging machine to one-half or one-third of that previously required. This permits a charging machine embodying the present invention to be used in plants where the location of the conventional type of charging machine would be impossible. Other advantages necessarily follow from building the machine thus compactly instead of spreading the parts over considerable space.

The gates at the bottom of the weigh hopper retard the fuel until the lower bell has fully descended so that the fuel strikes the bell with considerable force, thereby preventing the fuel from piling up in the center of the generator.

I claim as my invention:

1. Fuel-charging apparatus for a gas generator which comprises, in combination, an enclosure adapted to be positioned over the charging opening of the gas generator, a charging valve located in said enclosure and serving as the charging door of said generator, an inlet door in said enclosure, a weigh hopper suspended within said enclosure beneath said charging opening, means for delivering fuel through said inlet door to said weigh hopper, said means being responsive to the position of said inlet door and the weight of said weigh hopper and its contents, whereby fuel is delivered to said weigh hopper when said inlet door is open and said weigh hopper contains less than a predetermined quantity of fuel.

2. Fuel-charging apparatus for a gas generator which comprises, in combination, an enclosure adapted to be positioned over the charging opening of the gas generator, a charging valve located in said enclosure and serving as the charging door of said generator, an inlet door in said enclosure, a weigh hopper suspended within said enclosure beneath said charging opening, means for delivering fuel through said inlet door to said weigh hopper, said means being responsive to the position of said inlet door and the weight of said weigh hopper and its contents, whereby fuel is delivered to said weigh hopper when said inlet door is open and said weigh hopper contains less than a predetermined quantity of fuel, and a door located in the lower portion of said weigh hopper for releasing the contents of said weigh hopper into said generator.

3. Fuel-charging apparatus for a gas generator which comprises, in combination, an enclosure adapted to be positioned over the charging opening of the gas generator, a charging valve located in said enclosure and serving as the charging door of said generator, an inlet door in said enclosure, a weigh hopper suspended within said enclosure beneath said charging opening, means for delivering fuel through said inlet door to said weigh hopper, said means being responsive to the position of said inlet door and the weight of said weigh hopper and its contents, whereby fuel is delivered to said weigh hopper when said inlet door is open and said weigh hopper contains less than a predetermined quantity of fuel, and a door located in the lower portion of said weigh hopper that is actuated by said charging valve, whereby the contents of said weigh hopper are released into said generator when said charging valve is opened.

4. Fuel-charging apparatus for a gas generator which comprises, in combination, an enclosure adapted to be positioned over the charging opening of the gas generator, a charging valve located in said enclosure and serving as the charging door of said generator, an inlet door in said enclosure, a weigh hopper suspended within said enclosure beneath said charging opening, said weigh hopper having a reentrant portion forming a recess located above said charging valve, and motive means for said charging valve located in said recess.

5. Fuel-charging apparatus for a gas generator which comprises, in combination, an enclosure adapted to be positioned over the charging opening of the gas generator, a charging valve located in said enclosure and serving as the charging door of said generator, an inlet door in said enclosure, a weigh hopper suspended within said enclosure beneath said charging opening, said weigh hopper having a reentrant portion forming a recess located above said charging valve, motive means for said charging valve located in said recess, and a fuel-discharging door located in said reentrant portion of said weigh hopper and actuated by said charging valve.

6. Fuel-charging apparatus for a gas generator which comprises, in combination, an enclosure adapted to be positioned over the charging opening of the gas generator, a charging valve located in said enclosure and serving as the charging door of said generator, an inlet door in said enclosure, a weigh hopper suspended within said enclosure beneath said charging opening, means actuated by an electric motor for delivering fuel through said inlet door to said weigh hopper, a switch located in the electrical circuit of said motor and actuated by said inlet door and a second switch located in series with said other switch and said motor and actuated by said weigh hopper whereby said means is actuated to supply fuel to said weigh hopper only when said inlet valve is open and said weigh hopper contains less than a predetermined amount of fuel.

In testimony whereof, I have hereunto subscribed my name this 28th day of June, 1929.

GLEN R. WELLS.